US011948567B2

(12) United States Patent
Jin et al.

(10) Patent No.: US 11,948,567 B2
(45) Date of Patent: Apr. 2, 2024

(54) ELECTRONIC DEVICE AND CONTROL METHOD THEREFOR

(71) Applicant: SAMSUNG ELECTRONICS CO., LTD., Suwon-si (KR)

(72) Inventors: Jangho Jin, Suwon-si (KR); Jaehyun Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 363 days.

(21) Appl. No.: 17/418,314

(22) PCT Filed: Oct. 4, 2019

(86) PCT No.: PCT/KR2019/013021
§ 371 (c)(1),
(2) Date: Jun. 25, 2021

(87) PCT Pub. No.: WO2020/138662
PCT Pub. Date: Jul. 2, 2020

(65) Prior Publication Data
US 2022/0093097 A1  Mar. 24, 2022

(30) Foreign Application Priority Data
Dec. 28, 2018  (KR) .................... 10-2018-0172416

(51) Int. Cl.
*G10L 15/22* (2006.01)
*G10L 15/04* (2013.01)
(Continued)

(52) U.S. Cl.
CPC .............. *G10L 15/22* (2013.01); *G10L 15/04* (2013.01); *G10L 15/063* (2013.01);
(Continued)

(58) Field of Classification Search
CPC ....... G10L 15/22; G10L 15/04; G10L 15/063; G10L 15/1822; G10L 17/00; G10L 17/02;
(Continued)

(56) References Cited

U.S. PATENT DOCUMENTS 7,734,461 B2   6/2010  Kwak et al.
9,305,569 B2   4/2016  Jang et al.
(Continued)

FOREIGN PATENT DOCUMENTS

JP   6335139       5/2018
JP   2018-151631   9/2018
(Continued)

OTHER PUBLICATIONS

International Search Report dated Jan. 16, 2020 from International Application No. PCT/KR2019/013021, 4 pages.
(Continued)

*Primary Examiner* — Yogeshkumar Patel
(74) *Attorney, Agent, or Firm* — STAAS & HALSEY LLP

(57) ABSTRACT

The present disclosure provides an electronic device and a control method therefor. The electronic device of the present disclosure comprises: a voice reception unit; and a processor for, when a first user voice and a second user voice are received through the voice reception unit, determining whether the second user voice corresponds to a candidate of utterance subsequent to the first user voice on the basis of a result obtained by dividing a plurality of attributes of the second user voice according to a predefined attribute, and controlling the electronic device to perform an operation corresponding to the second user voice on the basis of the intent of the second user voice obtained through a result of the determination.

14 Claims, 9 Drawing Sheets

(51) Int. Cl.
*G10L 15/06* (2013.01)
*G10L 15/18* (2013.01)

(52) U.S. Cl.
CPC .... *G10L 15/1822* (2013.01); *G10L 2015/223* (2013.01); *G10L 2015/227* (2013.01)

(58) Field of Classification Search
CPC ................ G10L 15/1815; G10L 15/26; G10L 2015/223; G10L 2015/227; G06F 3/167; G06F 40/30; G06F 40/35
See application file for complete search history.

(56) References Cited

U.S. PATENT DOCUMENTS

| | | |
|---|---|---|
| 9,715,875 B2 | 7/2017 | Piernot et al. |
| 9,767,091 B2 | 9/2017 | Sarikaya et al. |
| 9,865,252 B2 | 1/2018 | Bak et al. |
| 9,865,258 B2 | 1/2018 | Dreuw |
| 9,886,952 B2 | 2/2018 | Choi et al. |
| 9,953,654 B2 | 4/2018 | Mun et al. |
| 10,229,683 B2 | 3/2019 | Leeb |
| 2012/0035935 A1 | 2/2012 | Park et al. |
| 2018/0143802 A1* | 5/2018 | Jang .................. G10L 15/30 |
| 2018/0314489 A1* | 11/2018 | Seo .................. G06F 3/0481 |
| 2020/0051554 A1 | 2/2020 | Kim et al. |

FOREIGN PATENT DOCUMENTS

| | | |
|---|---|---|
| KR | 10-0764174 | 9/2007 |
| KR | 10-2008-0024752 | 3/2008 |
| KR | 10-2014-0098525 | 8/2014 |
| KR | 10-2015-0087687 | 7/2015 |
| KR | 10-2015-0133586 | 11/2015 |
| KR | 10-1622111 | 5/2016 |
| KR | 10-2017-0106346 | 9/2017 |
| KR | 10-2018-0057922 | 5/2018 |
| KR | 10-2018-0058476 | 6/2018 |
| KR | 10-2018-0084392 | 7/2018 |
| WO | WO 2018/097549 A1 | 5/2018 |

OTHER PUBLICATIONS

Written Opinion of the International Searching Authority dated Jan. 16, 2020 from International Application No. PCT/KR2019/013021, 8 pages.
Office Action dated Sep. 27, 2023 issued in Korean Patent Application No. 10-2018-0172416

* cited by examiner

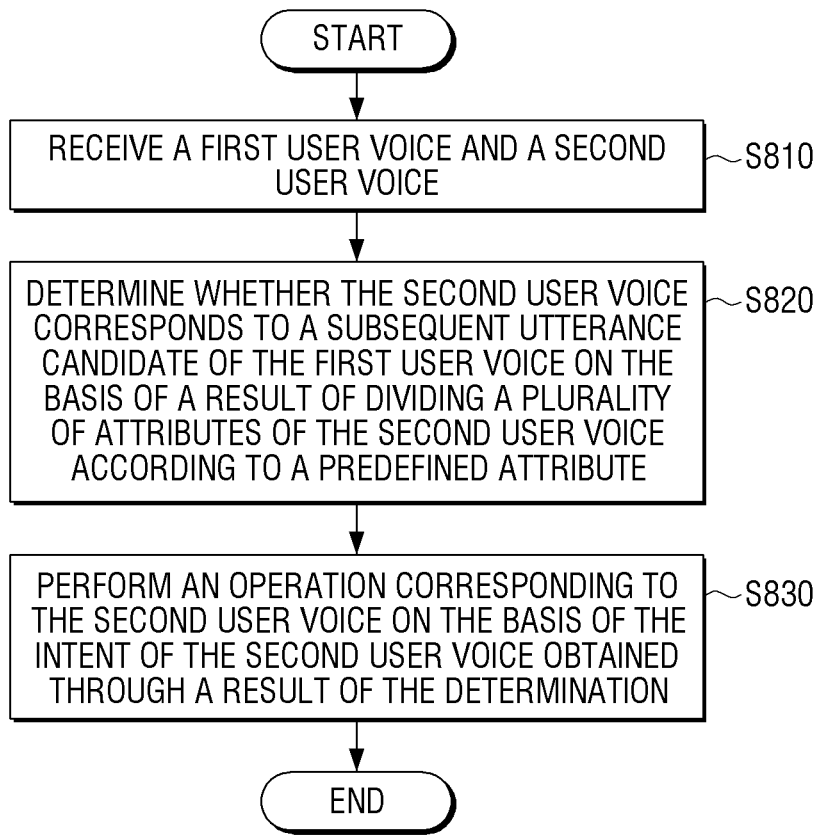

ELECTRONIC DEVICE AND CONTROL METHOD THEREFOR

CROSS-REFERENCE TO RELATED APPLICATIONS

This application is a U.S. National Stage Application, which claims the benefit under 35 U.S.C. § 371 of PCT International Patent Application No. PCT/KR2019/013021, filed Oct. 4, 2019 which claims the foreign priority benefit under 35 U.S.C. § 119 of Korean Patent Application No. 10-2018-0172416, filed Dec. 28, 2018, the contents of which are incorporated herein by reference.

TECHNICAL FIELD

The disclosure relates to an electronic device and a control method therefor, and more particularly, to an electronic device that determines whether a user utterance corresponds to a subsequent utterance candidate, and a control method therefor.

DESCRIPTION OF THE RELATED ART

Recently, as voice recognition technologies and artificial intelligence technologies are being developed, electronic devices that perform a function by receiving input of a user's voice as a command are increasing. An electronic device that received input of a user's voice converts the user's voice into a text, analyzes the intent of the user's utterance by using the converted text, and performs a function according to the intent included in the user's voice.

However, as a user's language patterns are diverse, there were cases where the conventional electronic devices provided incorrect information for a user voice.

For overcoming such a problem, the conventional electronic devices determined whether a user's current utterance corresponded to a subsequent utterance by using information on the time interval between the user's previous utterance and the current utterance. Here, a subsequent utterance means an utterance that maintains the intent and the domain of the user's previous utterance as they are.

That is, in the past, in case information on the time interval between the current user utterance and the previous user utterance was within a specific time, an electronic device regarded that the current user utterance was highly likely to be a subsequent utterance of the previous user utterance, and determined that the current utterance was highly likely to operate in the same domain as the domain of the previous utterance, and the intent of the current utterance also had a possibility of being the same as the intent of the previous utterance.

However, there is a limit to determine that the intent of a user's utterance is maintained only with information on the time interval.

DETAILED DESCRIPTION OF THE INVENTION

Technical Problem

The purpose of the disclosure is in providing a device that determines whether a user's current utterance is a subsequent utterance candidate of the previous utterance in consideration of attributes other than information on the time of the user's utterance, and a control method therefor.

Technical Solution

An electronic device according to an embodiment of the disclosure includes a voice reception part, and a processor configured to, based on a first user voice and a second user voice being received through the voice reception part, determine whether the second user voice corresponds to a subsequent utterance candidate of the first user voice based on a result obtained by classifying a plurality of attributes of the second user voice according to a predefined attribute, and control the electronic device to perform an operation corresponding to the second user voice based on the intent of the second user voice obtained through a result of the determination.

Also, the processor may classify the plurality of attributes according to relevance to the predefined attribute, adjust attribute values obtained from the plurality of classified attributes, and determine whether the second user voice corresponds to a subsequent utterance candidate of the first user voice based on the plurality of adjusted attribute values.

In addition, the processor may, for the plurality of respective attributes, apply different weights to the attribute values of the plurality of classified attributes according to the relevance to the predefined attribute.

Here, the plurality of attributes may be classified into a first attribute having relevance to the predefined attribute and a second attribute having no relevance to the predefined attribute.

Also, the processor may adjust a first attribute value for the first attribute obtained from the second user voice based on a first weight corresponding to the first attribute, and adjust a second attribute value for the second attribute obtained from the second user voice based on a second weight corresponding to the second attribute.

Here, the first weight may be bigger than the second weight.

In addition, the predefined attribute may include a time attribute indicating a time interval at which the first user voice and the second user voice were received, the first attribute may include at least one of an utterance frequency or a device state attribute indicating the state of the electronic device, and the second attribute may include at least one of a speaker attribute indicating whether a user who uttered the first user voice and a user who uttered the second user voice are the same user or a command attribute indicating similarity between commands included in the first user voice and the second user voice.

Further, the processor may determine respectively a user who uttered the first user voice and a user who uttered the second user voice, and based on the user who uttered the first user voice and the user who uttered the second user voice being the same, obtain the plurality of attribute values for the second user voice.

Also, the processor may, based on the second user voice being received within a predetermined time after the first user voice was received, classify the plurality of attributes of the second user voice according to the predefined attribute.

In addition, the processor may sum up the plurality of adjusted attribute values, and based on the summed-up attribute value being bigger than a predetermined threshold, determine that the second user voice corresponds to the subsequent utterance candidate, and based on the summed-up attribute value being smaller than or equal to the predetermined threshold, determine that the second user voice does not correspond to the subsequent utterance candidate.

Further, the processor may, based on the second user voice received after the first user voice corresponding to the subsequent utterance candidate, determine the intent of the second user voice based on the intent and the domain of the first user voice.

Meanwhile, a control method for an electronic device according to an embodiment of the disclosure includes the steps of receiving a first user voice and a second user voice, determining whether the second user voice corresponds to a subsequent utterance candidate of the first user voice based on a result obtained by classifying a plurality of attributes of the second user voice according to a predefined attribute, and controlling the electronic device to perform an operation corresponding to the second user voice based on the intent of the second user voice obtained through a result of the determination.

Also, the step of determining may include the steps of classifying the plurality of attributes according to relevance to the predefined attribute, adjusting attribute values obtained from the plurality of classified attributes, and determining whether the second user voice corresponds to a subsequent utterance candidate of the first user voice based on the plurality of adjusted attribute values.

In addition, the step of adjusting a plurality of attribute values may include the step of, for the plurality of respective attributes, applying different weights to the attribute values of the plurality of classified attributes according to the relevance to the predefined attribute.

Here, the plurality of attributes may be classified into a first attribute having relevance to the predefined attribute and a second attribute having no relevance to the predefined attribute.

Also, the step of adjusting a plurality of attribute values may include the steps of adjusting a first attribute value for the first attribute obtained from the second user voice based on a first weight corresponding to the first attribute, and adjusting a second attribute value for the second attribute obtained from the second user voice based on a second weight corresponding to the second attribute.

Here, the first weight may be bigger than the second weight.

In addition, the predefined attribute may include a time attribute indicating a time interval at which the first user voice and the second user voice were received.

Further, the first attribute may include at least one of an utterance frequency or a device state attribute indicating the state of the electronic device, and the second attribute may include at least one of a speaker attribute indicating whether a user who uttered the first user voice and a user who uttered the second user voice are the same user or a command attribute indicating similarity between commands included in the first user voice and the second user voice.

Also, the control method may include the steps of determining respectively a user who uttered the first user voice and a user who uttered the second user voice, and based on the user who uttered the first user voice and the user who uttered the second user voice being the same, obtaining the plurality of attribute values for the second user voice.

In addition, the step of adjusting a plurality of attribute values may include the step of, based on the second user voice being received within a predetermined time after the first user voice was received, classifying the plurality of attributes according to the predefined attribute.

Further, the step of determining whether the second user voice corresponds to a subsequent utterance candidate of the first user voice may include the steps of summing up the plurality of adjusted attribute values, and based on the summed-up attribute value being bigger than a predetermined threshold, determining that the second user voice corresponds to the subsequent utterance candidate, and based on the summed-up attribute value being smaller than or equal to the predetermined threshold, determining that the second user voice does not correspond to the subsequent utterance candidate.

Also, the control method may further include the step of, based on the second user voice received after the first user voice corresponding to the subsequent utterance candidate, determining the intent of the second user voice based on the intent and the domain of the first user voice.

Effect of the Invention

An electronic device according to the embodiment as described above determines whether a user's utterance corresponds to a subsequent utterance candidate by systematically combining various attribute information other than time information on the user's utterance, and determines the intent of the user voice in consideration of this. Accordingly, resources of an electronic device performing voice recognition can be reduced, and useful availability can be provided to a user.

BRIEF DESCRIPTION OF DRAWINGS

FIG. 8 is a diagram for illustrating a control method for an electronic device according to an embodiment of the disclosure.

BEST MODE FOR IMPLEMENTING THE INVENTION

Mode for Implementing the Invention

Figure 1A:
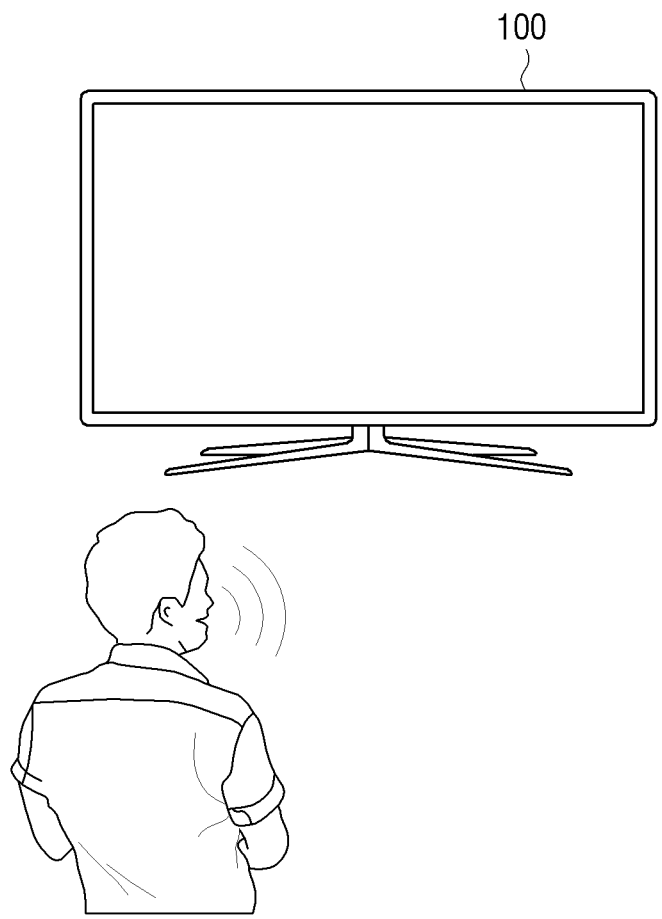
FIG. 1 is a diagram for illustrating an electronic device according to an embodiment of the disclosure.

Hereinafter, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies. Also, in particular cases, there are terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

In addition, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing embodiments, detailed explanation of related known technologies may unnecessarily confuse the gist of the disclosure, the detailed explanation will be omitted.

Further, terms such as "first," "second" and the like may be used to describe various elements, but the terms are not intended to limit the elements. Such terms are used only for the purpose of distinguishing one element from another element.

Also, singular expressions include plural expressions, unless defined obviously differently in the context. Further, in the disclosure, terms such as "include" and "consist of" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

Meanwhile, in the disclosure, "a module" or "a part" performs at least one function or operation, and may be implemented as hardware or software, or as a combination of hardware and software. Further, a plurality of "modules" or "parts" may be integrated into at least one module and implemented as at least one processor (not shown), except "modules" or "parts" which need to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Hereinafter, various embodiments of the disclosure will be described in detail with reference to the accompanying drawings.

Figure 1B:
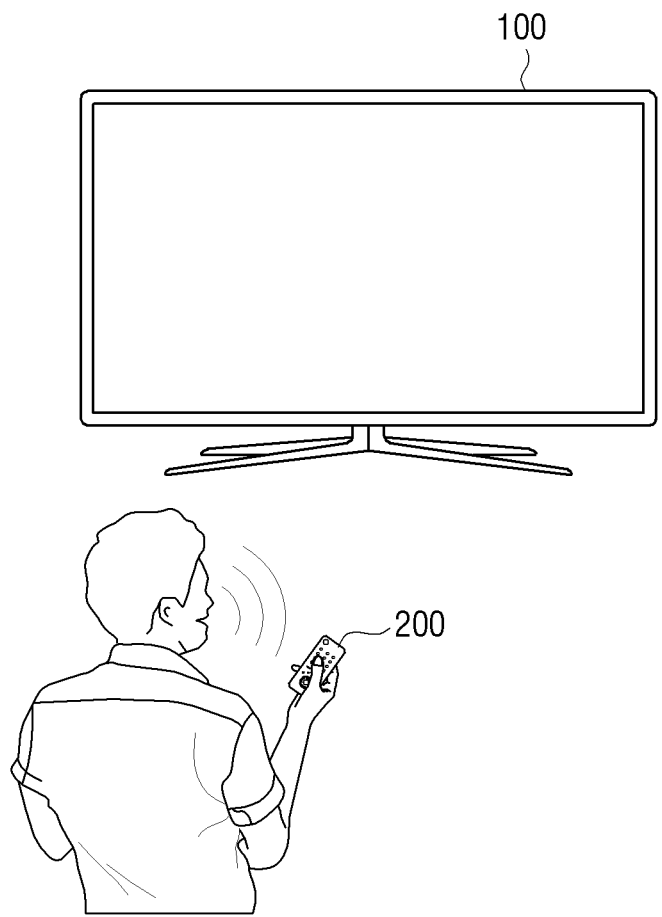

FIG. 1 is a diagram for illustrating an electronic device according to an embodiment of the disclosure. Specifically, FIG. 1A is a diagram for illustrating an electronic device that directly receives a user's voice, and FIG. 1B is a diagram for illustrating an electronic device that receives a user's voice signal from a remote control device including a microphone.

In FIG. 1A, an electronic device 100 receives a user voice, and performs voice recognition for the received user voice. Specifically, the electronic device 100 may perform pre-processing for the received user voice, perform voice recognition for the user voice and convert the user voice into a text (Speech to Text, STT), and identify the intent and the entity of the user voice based on the result of voice recognition.

For this, the electronic device 100 may include an automatic speech recognition (ASR) module, a natural language understanding (NLU) module, a dialogue management (DM) module, a natural language generation (NLG) module, etc.

The electronic device 100 may obtain information for a response for a user voice from, for example, a web server, etc. based on the result of natural language understanding, generate response information for the user voice based on the obtained information, and provide the response information to the user.

The electronic device 100 may use a dialogue system for providing response information to a user, and it may include an artificial intelligence agent for operating the dialogue system.

An artificial intelligence agent is a dedicated program for providing artificial intelligence (AI)-based services (e.g., a voice recognition service, an agent service, a translation service, a search service, etc.), and it may be executed by a conventional generic-purpose processor (e.g., a CPU) or a separate AI-dedicated processor (e.g., a GPU, etc.). In particular, an artificial intelligence agent may control various modules.

In this case, the electronic device 100 may output response information for a user voice generated in a natural language, and provide the information to the user.

Meanwhile, as in FIG. 1B, the electronic device 100 may receive a user voice from a remote control device 200. In this case, the remote control device 200 may include a microphone for receiving a user voice.

The remote control device 200 that received a user voice may convert the received user voice (an analog signal) into a digital signal, and transmit the converted digital signal to the electronic device 100 through wireless communication such as infrared communication, Bluetooth, Wi-Fi, etc. That is, the remote control device 200 may include a communicator (not shown) for performing communication with the electronic device 100, and the electronic device 100 may also include a communicator for performing communication with the remote control device. Here, the electronic device 100 may include a plurality of communicators such as a communicator for communicating with the remote control device 200 (e.g., a Bluetooth module) and a communicator for communicating with a server (not shown) or another electronic device (not shown) (e.g., an Ethernet modem, a Wi-Fi module, etc.). However, this is merely an embodiment, and the electronic device 100 may communicate with the remote control device 200, a server (not shown), and another electronic device (not shown) by using one communicator including a Wi-Fi module.

The remote control device 200 may be implemented as a remote controller, a mobile device such as a smartphone, a wearable device such as a smart watch, a pointing device, etc. In particular, on the remote control device 200, an application for controlling the electronic device 100 may be installed, and the application may control the electronic device 100.

In the case of FIG. 1B, an operation that the electronic device 100 performs after receiving a voice signal from the remote control device 200 is the same as the operation that the electronic device in FIG. 1A performs after pre-processing a user voice. Accordingly, for the convenience of explanation, explanation regarding the overlapping part will be omitted.

Meanwhile, according to an embodiment of the disclosure, the electronic device 100 may determine whether a user's voice corresponds to a subsequent utterance candidate for identifying the intent of the user who uttered the user voice more correctly.

Here, a subsequent utterance means an utterance of which utterance intent and domain are the same as those of the voice that the user uttered previously, and a subsequent utterance candidate means an utterance which is highly likely to be determined as a subsequent utterance as a result of natural language understanding.

The electronic device 100 receives a user voice, and determines whether the user voice corresponds to a subsequent utterance candidate by using a plurality of attributes included in the user voice. Specifically, when a user voice is received, the electronic device may classify a plurality of attributes of the user voice according to a predefined attribute, adjust attribute values obtained from the plurality of classified attributes, and determine whether the user voice corresponds to a subsequent utterance candidate based on the plurality of adjusted attribute values. Here, the predefined attribute may be a time attribute, but is not necessarily limited thereto.

More specifically, when a user voice is received, the electronic device 100 obtains a plurality of attribute values for the user voice based on a plurality of attributes, adjusts the plurality of obtained attribute values according to relevance to the predefined attribute, and determines whether the user voice corresponds to a subsequent utterance voice candidate.

Accordingly, according to various embodiments of the disclosure, the electronic device determines the possibility that a user voice is a subsequent utterance before performing natural language processing for the user voice, and thus the burden of the electronic device 100 performing natural language processing can be reduced. Also, as the electronic device 100 determines the possibility that a user voice is a subsequent utterance by using a plurality of attributes of the user voice, there is an advantage that the intent for the user voice can be determined more correctly.

Hereinafter, an electronic device that performs voice recognition according to various embodiments of the disclosure will be described in detail.

Figure 2:
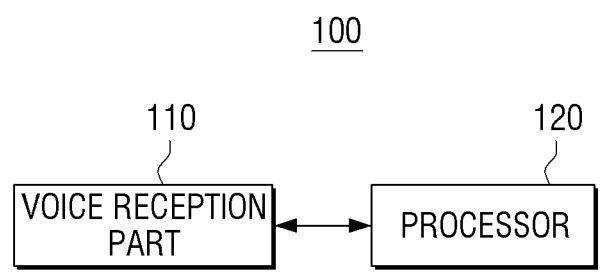
FIG. 2 is a block diagram for illustrating an electronic device according to an embodiment of the disclosure.

FIG. 2 is a block diagram for illustrating a configuration of an electronic device according to an embodiment of the disclosure.

Referring to FIG. 2, the electronic device 100 includes a voice reception part 110 and a processor 120.

The voice reception part 110 is a component for receiving a user's voice. The voice reception part 110 may generate (or convert) a voice or a sound received from the outside into an electronic signal.

For this, the voice reception part 110 may include various components such as a microphone collecting a user voice in an analogue form, an amp circuit amplifying the collected user voice, an A/D conversion circuit that samples the amplified user voice and converts the user voice into a digital signal, a filter circuit that removes noise components from the converted digital signal, etc.

An electronic signal generated at the voice reception part 110 may be transmitted to the processor 120, or stored in a memory (not shown). The processor 120 may compare the voice signal transmitted from the voice reception part 110 with another voice signal stored in the memory (not shown).

The processor 120 performs a function of controlling the overall operations of the electronic device 100 and signal flows among internal components of the electronic device 100, and processing data.

When a first user voice and a second user voice are received through the voice reception part 110, the processor 120 may determine whether the second user voice corresponds to a subsequent utterance candidate of the first user voice based on a result obtained by classifying a plurality of attributes of the second user voice according to a predefined attribute, and control the electronic device 100 to perform an operation corresponding to the second user voice based on the intent of the second user voice obtained through a result of the determination.

First, the processor 120 may classify the plurality of attributes of the second user voice according to relevance to the predefined attribute, and determine whether the second user voice corresponds to a subsequent utterance candidate of the first user voice based on the result of division.

Specifically, the processor 120 obtains a plurality of attribute values for the second user voice based on the plurality of attributes of the second user voice. Here, the plurality of attributes may include at least one of the time interval between the current utterance and the previous utterance, the speaker, the device state, the utterance frequency, or the command history.

The time interval attribute between the current utterance and the previous utterance among the plurality of attributes indicates the difference between the time when the user's voice (the current utterance) was input and the time when the user voice previously uttered (the previous utterance) was input. The attribute value for the time interval between the current utterance and the previous utterance may be indicated as time. For example, if the time interval between the current utterance and the previous utterance is 5 seconds, the attribute value for the time interval between the current utterance and the previous utterance may be 5. However, this is merely an embodiment, and the processor 120 may grant an attribute value for a time interval by classifying ranges for time. For example, the processor 120 may classify time by specific ranges by a method such as, if the time interval between the current utterance and the previous utterance is 1-10 seconds, classifying by 1, if the time interval is 20-30 seconds, classifying by 2, and if the time interval is 30-40 seconds or longer, classifying by 3, and grant an attribute value.

The speaker attribute among the plurality of attributes indicates whether the speaker of the current utterance and the speaker of the previous utterance are the same. If the speaker of the current utterance and the speaker of the previous utterance are the same, the processor 120 may calculate the value of 1, and if the speaker of the current utterance and the speaker of the previous utterance are different, the processor 120 may calculate the value of 0.

The device state attribute among the plurality of attributes means the execution state of the electronic device 100. Specifically, the device state attribute may indicate the on/off state of the display (not shown) of the electronic device 100 when the current utterance and the previous utterance were input into the electronic device 100, an execution state of an application, the kind of the application that is being executed, the location of the electronic device 100, and whether the distance between the electronic device 100 and the user, etc. was changed. For example, if the display of the electronic device 100 was in an off state at the time of the previous utterance, but the display of the electronic device 100 is in an on state at the time of the current utterance, the processor 120 may calculate the device state attribute value as 0.5, and in case the state of the device was not changed between the previous utterance and the current utterance, the processor 120 may calculate the device state attribute value as 1. Likewise, if the kind of the application executed in the electronic device 100 at the time of the previous utterance and the current utterance is the same, the processor 120 may calculate the device state attribute value as 1, and if the kind of the application was changed, the processor 120 may calculate the device state attribute value as 0.3. Meanwhile, regarding not only the on/off state of the display and the kind of the application, but also regarding the execution state of the application, the location of the electronic device 100, and whether the distance between the electronic device 100 and the user, etc. was changed, the aforementioned processor 120 may obtain an attribute value by the same method.

Meanwhile, the aforementioned types of the device state attribute are merely an embodiment, and the types are not necessarily limited thereto. That is, the types of the device state attribute may be diverse according to the type of the electronic device 100 and a user's habit of using the electronic device 100.

The utterance frequency attribute among the plurality of attributes may indicate the number of times that a user uttered a user voice during a specific time. That is, the utterance frequency attribute may indicate the number of times that the processor 120 received a user voice through the voice reception part 110 during a specific time.

The processor 120 may calculate the utterance frequency attribute value as (the number of times of receiving a user voice/the reference utterance number) during a predetermined time. For example, in case the reference utterance number is 10 during 60 seconds, and the number of times that the processor 120 received a user voice during 60 seconds is 7, the utterance frequency attribute value may be $7/10$. That is, the more the number of times that the processor 120 received a user voice during a predetermined time is, the bigger value the utterance frequency attribute value may have.

As described above, for calculating the utterance frequency attribute value, the processor 120 may count the number of times of receiving a user voice during a predetermined time.

Also, the command history attribute among the plurality of attributes indicates similarity between the converted current utterance and the previous utterance text when the user voice currently uttered and the user voice previously uttered were converted into texts. For this, the processor 120 may convert a user voice into a text by using an automatic speech recognition (ASR) module, and store the converted text in the memory (not shown).

The processor 120 may determine similarity through partial matching between the text of the current utterance and the text of the previous utterance. Specifically, the processor 120 may determine similarity between the text for the current utterance and the text of the previous utterance by using a pattern matching algorithm of character strings such as a Knuth-Morris-Pratt (KMP) algorithm and a Boyer-Moore algorithm. For example, in case the previous user voice is "Turn up the volume," and the current user voice is "Turn up the volume more," the processor 120 may determine that the "turn up" part of the current voice is the same as the previous user voice, and determine that the command history attribute value for the current user voice corresponds to $3/4$ by using (the number of characters in the text for the current utterance which are the same as the previous utterance/the total number of characters of the text for the current user voice).

Meanwhile, this is merely an embodiment, and the command history attribute, i.e., similarity between the text for the current utterance and the text of the previous utterance may be calculated by various methods. For example, the processor 120 may determine similarity between texts by classifying the text for the current utterance in word units and matching them with the text of the previous utterance.

The processor 120 may determine respectively a user who uttered the first user voice and a user who uttered the second user voice, and in case the user who uttered the first user voice and the user who uttered the second user voice are the same, the processor 120 may obtain a plurality of attribute values for the second user voice. In contrast, in case the user who uttered the first user voice and the user who uttered the second user voice are not the same, the processor 120 may not determine whether the second user voice is a subsequent utterance candidate.

The processor 120 may classify a plurality of attributes of the second user voice according to relevance to a predefined attribute, and adjust attribute values of the plurality of classified attributes. Specifically, in case the second user voice was received within a predetermined time after the first user voice was received, the processor 120 may classify the plurality of obtained attributes according to relevance to a predefined attribute, and adjust the attribute values thereof.

That is, the processor 120 adjusts the plurality of attribute values if the time of receiving the first user voice and the time of receiving the second user voice are within a specific time. Thus, the predefined attribute which becomes a standard for adjusting the plurality of attribute values may be the time interval attribute that the first user voice and the second user voice were received.

The processor 120 may apply different weights to the attribute values of the plurality of classified attributes according to relevance to the predefined attribute for the plurality of respective attributes.

Here, the plurality of attributes may be classified into a first attribute having relevance to the predefined attribute and a second attribute having no relevance to the predefined attribute.

For example, as described above, in case the predefined attribute is the time interval between the current utterance and the previous utterance, the utterance frequency and the device state attribute indicating the state of the electronic device 100 are attributes that are highly likely to be influenced by time. Thus, the first attribute may include at least one of the utterance frequency or the device state attribute indicating the state of the electronic device 100.

The processor 120 may apply a first weight to the first attribute that is highly likely to be influenced by time.

In contrast, the speaker attribute and the command attribute among the aforementioned plurality of attributes are relatively less likely to be influenced by time. The processor 120 determines whether the second user voice is a subsequent utterance candidate only in case the speakers are the same, i.e., obtaining attribute values of the second user voice is based on the premise that the speaker of the second user voice is the same as the speaker of the first user voice, and thus the speaker attribute is less likely to be influenced by time. Also, a command includes a user's direct intent, and a command is not changed according to the time interval at which the first user voice and the second user voice were received, and thus the command attribute is also less likely to be influenced by time.

As described above, the speaker attribute and the command attribute among the aforementioned plurality of attributes are attributes that are relatively less likely to be influenced by time, and thus the second attribute may include at least one of the speaker attribute indicating whether a user who uttered the first user voice and a user who uttered the second user voice are the same user or the command attribute indicating similarity between commands included in the first user voice and the second user voice.

In this case, the processor 120 may apply a second weight to the second attribute that is less likely to be influenced by time.

The processor 120 may adjust a first attribute value for the first attribute obtained from the second user voice based on the first weight corresponding to the first attribute, and adjust a second attribute value for the second attribute obtained from the second user voice based on the second weight corresponding to the second attribute.

Here, the first attribute is an attribute related to the predefined attribute, and thus the first weight corresponding to the first attribute may be bigger than the second weight corresponding to the second attribute. For example, as the first weight is a value corresponding to the first attribute related to the predefined attribute, the first weight may be a value exceeding 1, and as the second weight is a value corresponding to the second attribute not related to the predefined attribute, the second weight may be a value which is 1 or smaller than or equal to 1.

Meanwhile, as another embodiment of the disclosure, the first attribute related to the predefined attribute may include a plurality of attributes, and the plurality of attributes included in the first attribute (e.g., the utterance frequency attribute and the device state attribute) may respectively have different weights from one another. Likewise, the second attribute may also include a plurality of attributes (e.g., the speaker attribute and the command history attribute), and the plurality of attributes included in the second attribute may respectively have different weights from one another.

Meanwhile, the first weight and the second weight are values obtained by an experiment, and they may be predetermined values.

The processor 120 may determine whether the second user voice corresponds to a subsequent utterance candidate of the first user voice based on the plurality of adjusted attribute values. The processor 120 may sum up the plurality of adjusted attribute values, and in case the summed-up attribute value is bigger than a predetermined threshold, the processor 120 may determine that the second user voice corresponds to a subsequent utterance candidate, and in case the summed-up attribute value is smaller than or equal to the predetermined threshold, the processor 120 may determine that the second user voice does not correspond to a subsequent utterance candidate. The method for the processor 120 to sum up the plurality of adjusted attribute values will be described in detail with reference to FIG. 5.

Meanwhile, the processor 120 may determine an intent for the second user voice based on whether the second user voice corresponds to a subsequent utterance candidate. In case the processor 120 determined that the second user voice received after the first user voice corresponds to a subsequent utterance candidate, the processor 120 may determine the intent of the second user voice based on the intent and the domain of the first user voice.

Specifically, the processor 120 determines the intent of the user for the second user voice by using a natural language understanding (NLU) module, and in case it was determined that the second user voice corresponds to a subsequent utterance candidate of the first user voice, the processor 120 may determine that there is a high possibility that the intent and the domain of the second user voice are the same as the intent and the domain of the first user voice, and consider the intent and the domain of the first user voice first in determining the intent and the domain for the second user voice. For this, the first user voice and information on the first user voice may be stored in the memory (not shown).

In contrast, in case it is not determined that the second user voice corresponds to a subsequent utterance candidate of the first user voice, the processor 120 may determine the intent and the domain for the second user voice by using a natural language understanding (NLU) module regardless of a subsequent utterance candidate of the first user voice. As the technology for natural language processing is a known technology, detailed explanation will be omitted.

Then, the processor 120 may control the electronic device 100 to perform an operation corresponding to the second user voice based on the determined intent.

Figure 3:
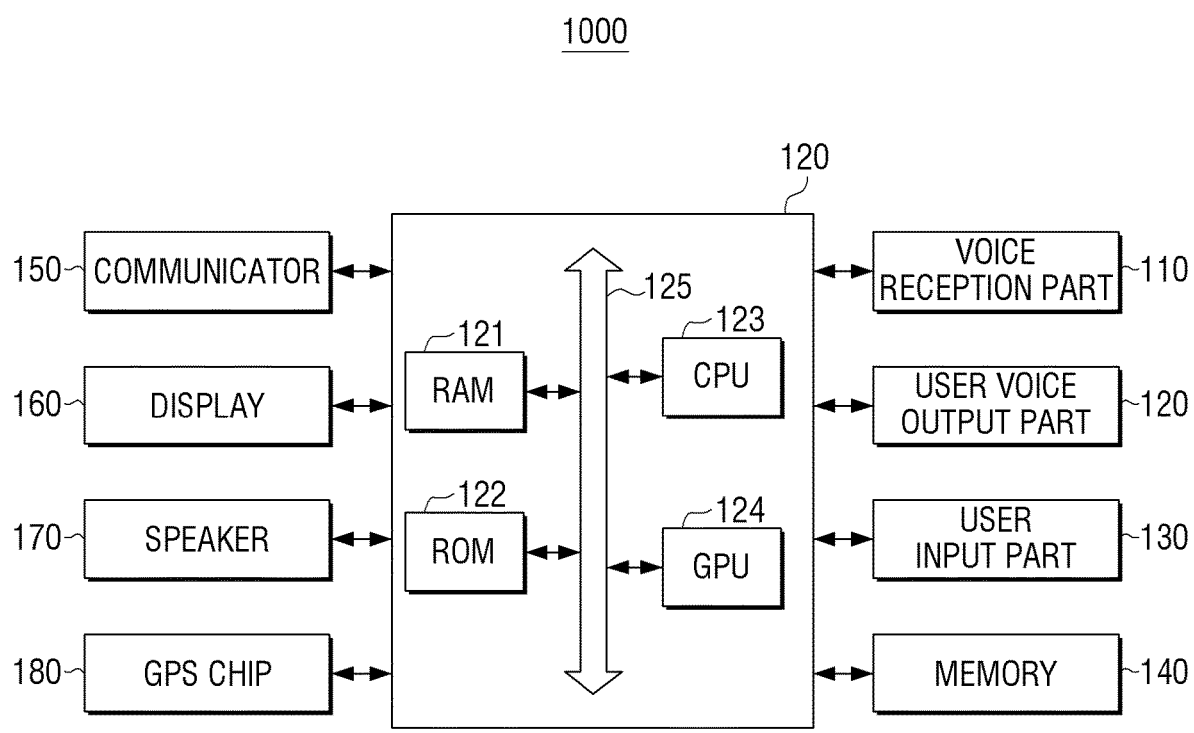
FIG. 3 is a detailed block diagram for illustrating in more detail an electronic device according to an embodiment of the disclosure.

FIG. 3 is a detailed block diagram for illustrating in more detail an electronic device according to an embodiment of the disclosure.

Referring to FIG. 3, the electronic device 100 may include a voice reception part 110, a processor 120, a voice output part 130, a user input part 140, a memory 150, a communicator 160, a display 170, a camera 180, and a GPS chip 190. Also, appropriate hardware/software components of a level obvious to a person skilled in the art may be additionally included in the electronic device 100, although they were not illustrated depending on embodiments. Further, depending on embodiments, some components may be excluded.

The voice output part 130 is a component that can output audio. For example, the voice output part 130 may output response information for the second user voice as a sound.

The user input part 140 may receive a user input and transmit the user input to the processor 120. The user input part 140 may include, for example, a touch sensor, a (digital) pen sensor, a pressure sensor, and a key. A touch sensor may use, for example, at least one method among a capacitive method, a decompressive method, an infrared method, and an ultrasonic method. A (digital) pen sensor may be, for example, a part of a touch panel, or it may include a separate sheet for recognition. A key may include, for example, a physical button, an optical key, or a keypad.

The memory 150 may store computer executable instructions for performing the control method for an electronic device described in the disclosure.

The memory 150 may include software and/or firmware consisting of one or more modules. The modules may correspond to a gathering of computer executable instructions.

According to an embodiment of the disclosure, in the memory 150, the first user voice and information in that regard (the intent, the domain, etc.) may be stored.

The communicator 160 may be connected to a network through wireless communication or wired communication, for example, and communicate with an external device. Wireless communication may use, for example, at least one of long-term evolution (LTE), LTE Advance (LTE-A), a code division multiple access (CDMA), a wideband CDMA (WCDMA), a universal mobile telecommunications system (UMTS), a Wireless Broadband (WiBro), or a Global System for Mobile Communications (GSM) as a cellular communication protocol, for example. Also, wireless communication may include, for example, near field communication. Near field communication may include, for example, at least one of wireless fidelity direct (WiFi Direct), Bluetooth, near field communication (NFC), or Zigbee. Wired communication may include, for example, at least one of a universal serial bus (USB), a recommended standard 232 (RS-232), or a plain old telephone service (POTS), a wired local area network (LAN), etc. A network may include a telecommunications network, for example, at least one of a computer network (e.g.: a LAN or a WAN), the Internet, or a telephone network.

The communicator 160 may include a first communicator (not shown) communicating by a first communication method and a second communicator (not shown) communicating by a second communication method different from the first communication method. For example, the electronic device 100 may include a first communicator performing communication with a server by using wireless communication such as Wi-Fi and Ethernet, and a second communicator for performing communication with the remote control device 200 by using remote near field communication.

The display 170 is a component for outputting an image. The display 170 may be implemented as, for example, a liquid crystal display (LCD), a light-emitting diode (LED) display, an organic light-emitting diode (OLED) display (e.g., an active-matrix organic light-emitting diode (AMO-LED), a passive-matrix OLED (PMOLED)), or a microelectromechanical systems (MEMS) display, or an electronic paper display. The display 170 and the touch sensor of the user input part 140 may constitute an interlayer structure, and implemented as a touch screen.

The interface 180 is a component for connecting the electronic device 100 and an external device (not shown). The electronic device 100 may transmit a video/audio signal to an external device (not shown) by using the interface 180. The interface 180 may be implemented as an HDMI, a DP, a DVI, a Thunderbolt, etc. and the electronic device 100 may transmit a video/audio signal to an external device 200, and receive the video/audio signal at the external device 200. However, this is merely an embodiment, and the interface 180 may be implemented separately as an audio port and a video port, respectively.

The camera 180 is a component for photographing a still image or a moving image according to control by a user. The camera 180 may be implemented as a plurality of cameras such as a front surface camera and a rear surface camera. A specific application may access a photograph, a moving image, etc. photographed by using the camera 180 according to authority for access. In case the application is separated, access to the photograph and the moving image may be blocked.

The GPS chip 190 is a component for calculating the current location of the electronic device 100 by receiving a GPS signal from a Global Positioning System (GPS) satellite. The processor 120 may obtain user location information at the time when the user uttered a voice by using the GPS chip 190, and determine whether the user's location was changed by using the information and obtain a device state attribute value.

For the description regarding the voice reception part 110 and the processor 120, the description regarding the voice reception part 110 and the processor 120 in FIG. 2 can be cited.

The processor 120 may control the components of various kinds of hardware or software included in the electronic device 100, and perform various kinds of data processing and operations. Also, the processor 120 may load an instruction or data received from at least one of other components on the memory and process them, and store various data in a non-volatile memory. For this, the processor 120 may be implemented as a dedicated processor for performing a corresponding operation (e.g., an embedded processor), or a generic-purpose processor that can perform corresponding operations by executing one or more software programs stored in a memory device (e.g.: a CPU or an application processor).

The processor 120 may include a RAM 121, a ROM 122, a CPU 123, a graphic processing unit (GPU) 124, and a bus 125. The RAM 121, the ROM 122, the CPU 123, the GPU 124, etc. may be connected with one another through the bus 125.

The CPU 123 may access the memory 150, and perform booting by using the O/S stored in the memory 150. Also, the CPU 123 may perform various operations by using various kinds of programs, contents, data, etc. stored in the memory 150.

In the ROM 122, a set of instructions for system booting, etc. are stored. When a turn-on instruction is input and power is supplied, the CPU 123 copies the O/S stored in the memory 150 in the RAM 121 according to the instruction stored in the ROM 122, and boots the system by executing the O/S. When booting is completed, the CPU 123 copies various kinds of programs stored in the memory 150 in the RAM 121, and performs various kinds of operations by executing the programs copied in the RAM 121. When booting of the electronic device 100 is completed, the GPU 124 may activate the voice reception part 110.

Figure 4:
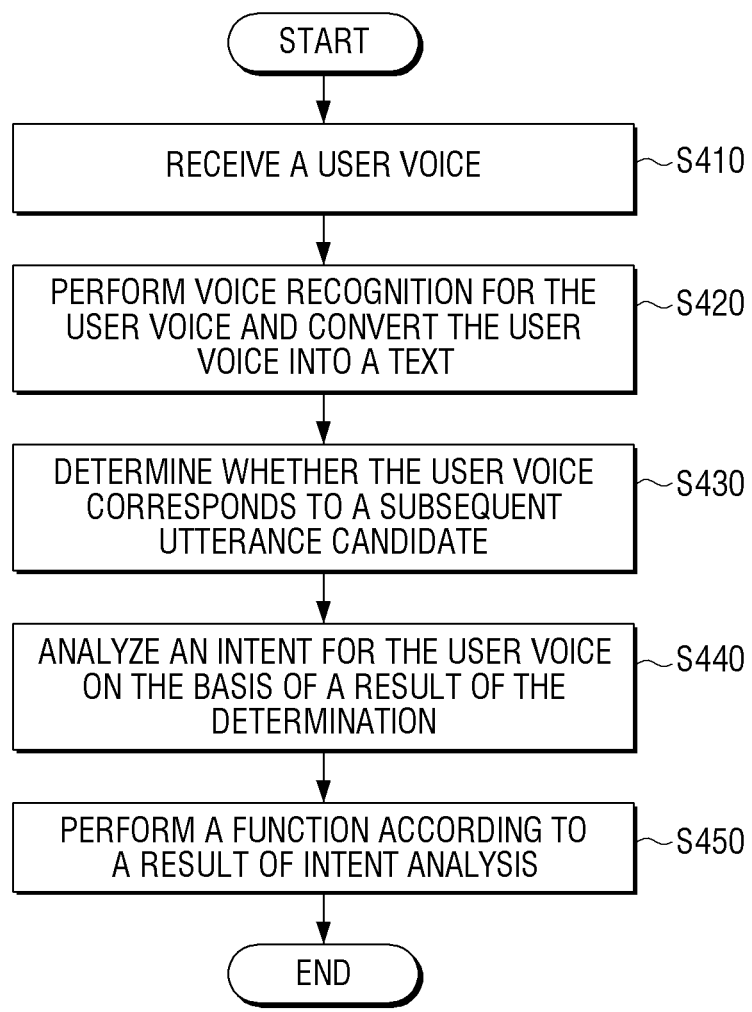
FIG. 4 and FIG. 5 are flow charts for illustrating a control method for an electronic device according to an embodiment of the disclosure.
Figure 5:
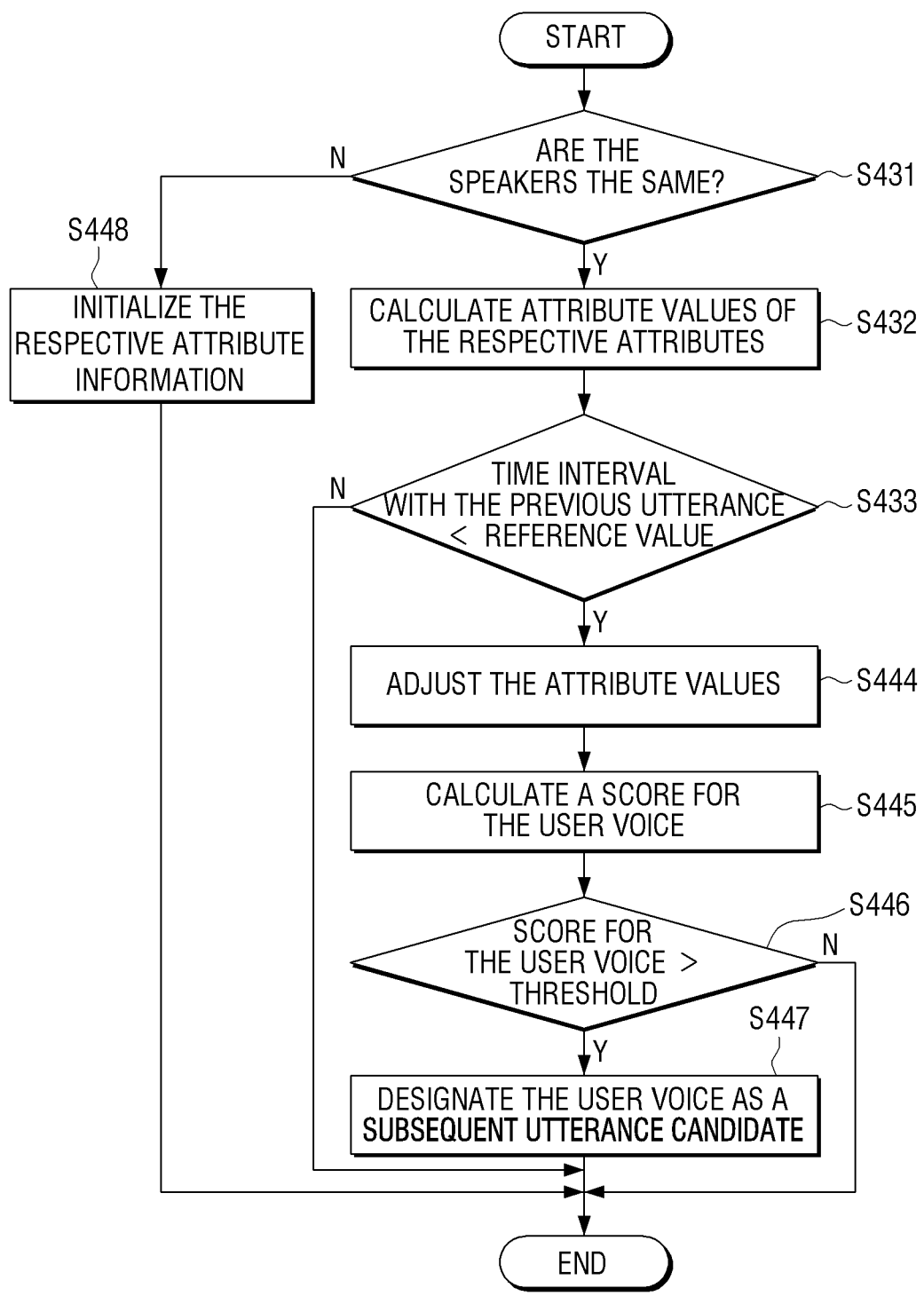

FIG. 4 and FIG. 5 are flow charts for illustrating operations of an electronic device according to an embodiment of the disclosure. The electronic device 100 may receive a user voice by using the voice reception part 110 in operation S410. Here, the user may notify the beginning of utterance to the electronic device 100 by using a button included in the electronic device 100 or a displayed UI. Also, the user may notify the beginning of utterance to the electronic device 100 by uttering a trigger sentence of voice recognition such as 'Hi, Bixby.'

When the user's utterance is completed, the processor 120 may perform voice recognition for the user voice and convert the user voice into a text in operation S420. Specifically, the processor 120 may convert the user voice into a text by using an automatic speech recognition (ASR) module. The automatic speech recognition (ASR) module is a module for converting a voice signal into a text (Speech to Text, STT), and it may convert a voice signal into a text by using various STT algorithms that were disclosed previously.

For example, the processor 120 may detect the beginning and the end of the voice that the speaker uttered within the received user voice by using the ASR module, and determine the voice section. Specifically, the processor 120 may calculate the energy of the received voice signal, classify the energy level of the voice signal according to the calculated energy, and detect the voice section through dynamic programing. Then, the processor 120 may detect phonemes which are minimum units of a voice based on an acoustic model within the detected voice section and generate phoneme data, and apply a Hidden Markov Model (HMM) probability model to the generated phoneme data, and convert the speaker's voice into a text. Meanwhile, this is merely an embodiment, and the processor 120 may convert the user voice signal into a text according to various STT algorithms.

The processor 120 may determine whether the user voice corresponds to a subsequent utterance candidate by using the converted text in operation S430. Detailed content in this regard will be described with reference to FIG. 5.

Referring to FIG. 5, the processor 120 may determine whether the speaker of the second user voice is the same as the speaker of the first user voice previously uttered by using acoustic characteristics of the received user voice in operation S431. Here, the acoustic characteristics of the user voice may include a spectrum characteristic indicating distribution of the user voice for the respective frequencies, and a prosody characteristic indicating the pitch, the size, the speed, the rhythm, the accent, etc. of the user voice.

In case it was determined that the speaker of the second user voice is the same as the speaker of the first user voice, the processor 120 may calculate attribute values of the plurality of attributes for the second user voice in operation S432. As the detailed content in this regard was described earlier in FIG. 3, overlapping explanation will be omitted for the convenience of explanation.

Afterwards, the processor 120 may determine whether the time interval between the utterance time of the second user voice and the utterance time of the first user voice is smaller than a reference value in operation S433. If the second user voice is uttered after a predetermined time passed after the utterance of the first user voice, there is a high possibility that the intent of the second user voice is different from the intent of the first user voice. Accordingly, the processor 120 may determine whether the second user voice is a subsequent utterance candidate only when the second user voice was uttered within the predetermined time after the utterance of the first user voice.

Meanwhile, in FIG. 5, it was determined whether the time interval attribute is smaller than the reference value in operation S433 after calculating the plurality of attribute values of the second user voice in operation S432. However, depending on cases, the plurality of attribute values of the second user voice may be calculated in operation S432 after determining first whether the time interval attribute of the first and second user voices is smaller than the reference value in operation S433.

Afterwards, the processor 120 may adjust the plurality of attribute values of the second user voice according to relevance to a predefined attribute in operation S434. Specifically, as described earlier in FIG. 3, the processor 120 may classify the plurality of attributes of the second user voice into the first attribute (the utterance frequency attribute and the device state attribute related to the time attribute) and the second attribute (the speaker attribute and the command attribute) based on the time attribute indicating the time interval at which the first and second user voices were received, and apply the first weight to the first attribute, and apply the second weight to the second attribute, and adjust the attribute values for the second user voice. As detailed explanation in this regard was made earlier in FIG. 3, detailed descriptions regarding overlapping parts will be omitted.

The processor 120 may calculate a score for the second user voice by using the plurality of adjusted attribute values of the second user voice in operation S435. Specifically, the processor 120 may calculate a score for the second user voice by using the following formula 1.

[Formula 1]

$$\text{Score for the second user voice} = \left[ \frac{1}{\text{Time interval attribute}} \times \right.$$
$$\left\{ \begin{pmatrix} \text{Device} \\ \text{state} \\ \text{attribute} \end{pmatrix} \times \begin{pmatrix} \text{First} \\ \text{weight} \end{pmatrix} - \begin{pmatrix} \text{Utterance} \\ \text{frequency} \\ \text{attribute} \end{pmatrix} \times \begin{pmatrix} \text{First} \\ \text{weight} \end{pmatrix} \right\} +$$
$$\left\{ \begin{pmatrix} \text{Command} \\ \text{history} \\ \text{attribute} \end{pmatrix} \times \begin{pmatrix} \text{Second} \\ \text{weight} \end{pmatrix} - \begin{pmatrix} \text{Speaker} \\ \text{division} \\ \text{attribute} \end{pmatrix} \times \begin{pmatrix} \text{Second} \\ \text{weight} \end{pmatrix} \right\} \right]$$

Specifically, the device state attribute and the utterance frequency attribute are related to the time interval attribute. Accordingly, the time interval attribute value may be multiplied with the adjusted device state attribute value and utterance frequency attribute value. Here, the smaller the time interval is, the more likely the second user voice is a subsequent utterance candidate, and thus (1/the time interval attribute) is multiplied. Meanwhile, this is merely an embodiment, and if, in the step of calculating the attribute values of the user voice, it was calculated such that the value of the time interval attribute becomes smaller as the time interval is bigger, (the time interval attribute), but not (1/the time interval attribute) may be multiplied.

Meanwhile, as described earlier in FIG. 3, the first weight for the first attribute (e.g., the device state attribute and the utterance frequency attribute) related to the time-related attribute may have different weights respectively for the device state attribute and the utterance frequency attribute. Also, the second weight for the second attribute (e.g., the command history attribute and the speaker division attribute) not related to the time-related attribute may have different weights respectively for the command history attribute and the speaker division attribute. In this case, a score for the second user voice may be calculated as in the following formula 2.

[Formula 2]

$$\text{Score for the second user voice} = \left[ \frac{1}{\text{Time interval attribute}} \times \right.$$
$$\left\{ \begin{pmatrix} \text{Device} \\ \text{state} \\ \text{attribute} \end{pmatrix} \times \begin{pmatrix} \text{Device} \\ \text{state} \\ \text{attribute} \\ \text{weight} \end{pmatrix} - \begin{pmatrix} \text{Utterance} \\ \text{frequency} \\ \text{attribute} \end{pmatrix} \times \begin{pmatrix} \text{Utterance} \\ \text{frequency} \\ \text{attribute} \\ \text{weight} \end{pmatrix} \right\} \right] +$$
$$\left\{ \begin{pmatrix} \text{Command} \\ \text{history} \\ \text{attribute} \end{pmatrix} \times \begin{pmatrix} \text{Command} \\ \text{history} \\ \text{attribute} \\ \text{weight} \end{pmatrix} - \begin{pmatrix} \text{Speaker} \\ \text{division} \\ \text{attribute} \end{pmatrix} \times \begin{pmatrix} \text{Speaker} \\ \text{division} \\ \text{attribute} \\ \text{weight} \end{pmatrix} \right\}$$

In case the calculated score for the second user voice is greater than or equal to a predetermined threshold in operation S436-Y, the processor 120 may designate the second user voice as a subsequent utterance candidate for the first user voice. In contrast, in case the score for the second user voice is smaller than a predetermined threshold in operation S436-N, the processor 120 may determine that the second user voice is not so much related to the first user voice.

Through the steps in FIG. 5 as above, the processor 120 may determine whether a user voice corresponds to a subsequent utterance candidate.

Returning to FIG. 4, the processor 120 may analyze an intent for the second user voice based on a result of determining whether the second user voice corresponds to a subsequent utterance candidate. Here, the processor 120 may use the natural language understanding (NLU) module stored in the electronic device 100 for analyzing the intent for the second user voice.

As described earlier in FIG. 2, in case it is determined that the second user voice corresponds to a subsequent utterance candidate, the processor 120 may regard that the intent and the domain of the second user voice coincide with the intent and the domain of the first user voice, and consider the intent and the domain of the first user voice first in determining the intent and the domain of the second user voice. Also, in this case, the electronic device 100 performing intent analysis may achieve effects such as reduction of resources, improvement of the processing speed, improvement of accuracy for the second user voice, etc.

For example, a case wherein the first user voice is "Find XXX on the 000 website," and the second user voice that the same user uttered within a predetermined time is "Find AAA," and the processor 120 determined that, as a result of calculating the attribute values for the second user voice, the second user voice corresponds to a subsequent utterance candidate will be assumed.

In this case, the processor 120 may determine that there is a high possibility that the intent and the domain of the second user voice coincide with the intent and the domain of the first user voice, and consider the intent and the domain of the first user voice first in determining the intent and the domain of the second user voice. That is, the processor 120 may determine that the intent of the second user voice is 'search,' and the domain may be the 000 website, and determine that the intent is highly likely to be an intent of searching AAA on the 000 web site.

Meanwhile, after analyzing the intent for the second user voice, the processor 120 performs a function according to the result of intent analysis in operation S450. Specifically, the processor 120 may perform a function corresponding to the intent of the second user voice in the domain of the second user voice, based on the information on the intent and the domain of the second user voice obtained as a result of intent analysis.

The processor 120 may obtain information for a response for the second user voice from, for example, a web server, etc. based on the result of natural language understanding, and generate information on the second user response based on the obtained information.

The processor 120 may generate information on the second user response by using a natural language generation (NLG) module or an artificial intelligence agent, and provide the generated information on the second user response to the user through the display 160 or the voice output part 120. For example, citing the aforementioned example, the processor 120 may perform processing such that a screen of searching AAA on the 000 website can be displayed, or output the result of search as a voice.

Meanwhile, in FIG. 5, it was illustrated that the electronic device 100 determines whether the second user voice corresponds to a subsequent utterance candidate, but some steps of this process may be performed in another device such as an external device (not shown) or a server. Detailed explanation in this regard will be made with reference to FIG. 6 and FIG. 7 below.

Figure 6:
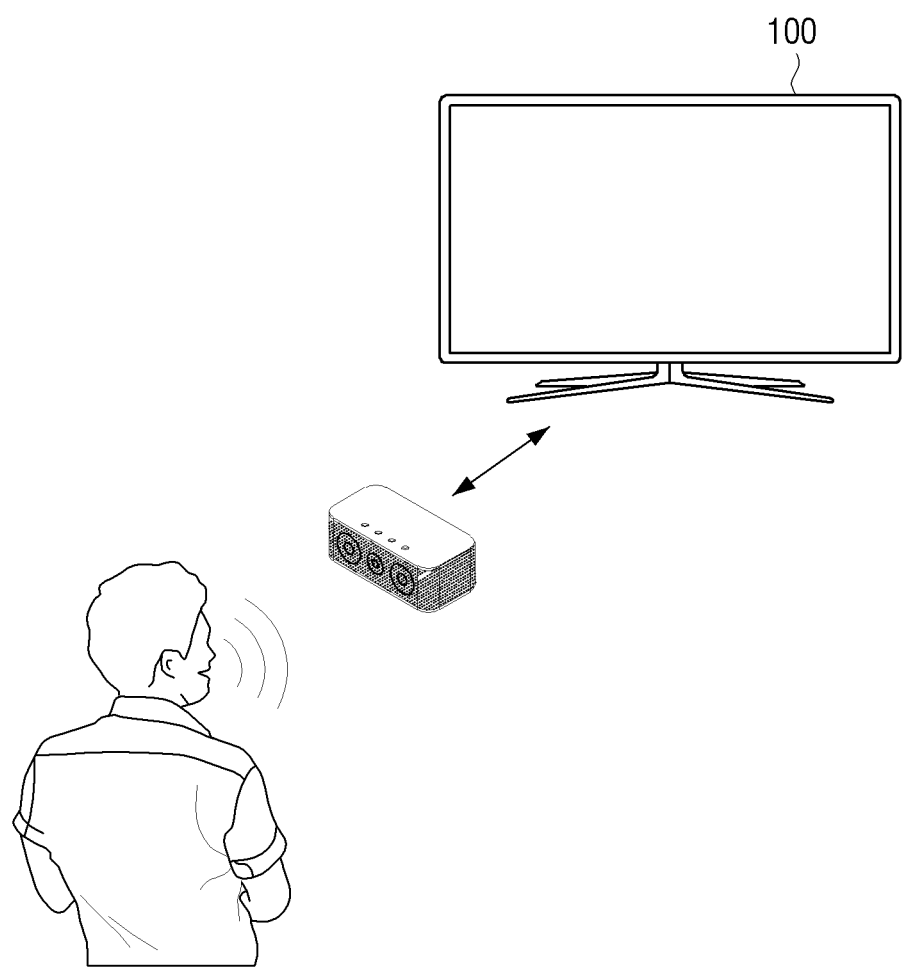
FIG. 6 and FIG. 7 are diagrams for illustrating an electronic device according to an embodiment of the disclosure.
Figure 7:
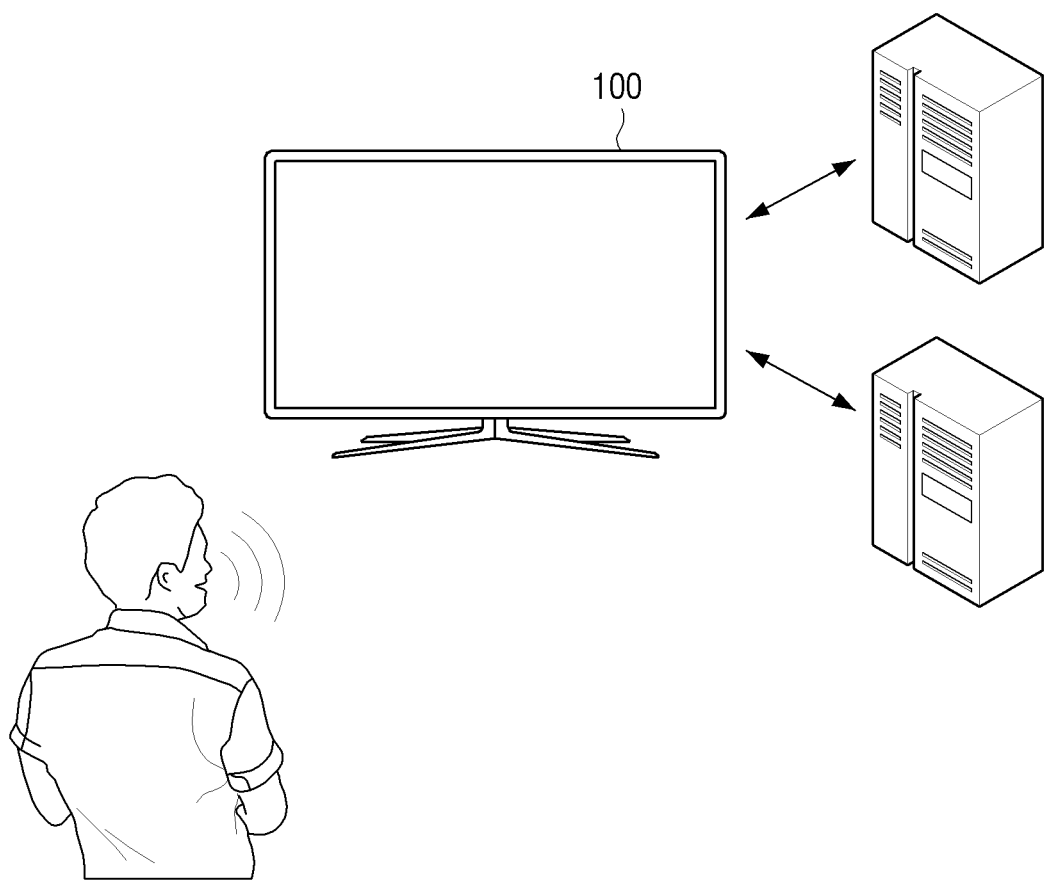

FIG. 6 and FIG. 7 are diagrams for illustrating an electronic device according to an embodiment of the disclosure.

As illustrated in FIG. 6, the electronic device 100 may not include a display. In this case, the electronic device 100 may receive a voice command for controlling the display device 300 from a user, and transmit the command to the display device 300.

For example, it is assumed that the electronic device 100 received a command for controlling the display device 300 from a user. The electronic device 100 may receive a user voice command and convert the command into a text, and determine whether the user voice corresponds to a subsequent utterance candidate through the process in FIG. 6. Then, the electronic device 100 may determine that the intent for the user voice is for controlling the display device 300 through natural language processing for the user voice.

In this case, the electronic device 100 may transmit a control signal corresponding to the user voice command to the display device 300, and the display device 300 may perform an operation according to the received signal.

For this, the electronic device 100 may be connected with other external devices including the display device 300 by wire/wirelessly. The electronic device 100 may include an output interface for transmitting a video signal or an audio signal to the display device 300. Specifically, the electronic device may include an interface such as an HDMI, a DP, a Thunderbolt, etc. for transmitting a video signal or an audio signal simultaneously, or an interface for transmitting only a video, or an interface for transmitting only audio. Also, the electronic device 100 may include a communicator for connecting with the display device 300 wirelessly.

As illustrated in FIG. 7, the electronic device 100 may be connected with servers 400 and 500.

The electronic device 100 that received a user voice may pre-process the user voice and convert the user voice into a digital signal, and transmit the converted voice signal to an automatic speech recognition (ASR) server 400.

The automatic speech recognition server 400 may perform voice recognition for the received user voice signal, and convert the user voice signal into a text. For this, the automatic speech recognition server 400 may use various Speech to Text (STT) algorithms.

For example, the electronic device 100 that received a user voice 'How about the weekend?' may convert the user voice into a digital signal and transmit the signal to the automatic speech recognition server 400, and the automatic speech recognition server 400 may convert the signal into a text.

After converting the user voice signal into a text, the automatic speech recognition server 400 may transmit the result of voice recognition to the electronic device 100.

The electronic device 100 may determine whether the user voice corresponds to a subsequent utterance candidate by using the received text, and transmit the result of determination and the user voice converted into a text to a natural language understanding (NLU) server 500.

For example, it is assumed that a user uttered "How is the weather in Seoul tomorrow?" before uttering a user voice "How about the weekend?".

The electronic device 100 may determine that the user voice "How about the weekend?" is a subsequent utterance candidate of "How is the weather in Seoul tomorrow?" in consideration of a plurality of attribute values and weights of "How about the weekend?" according to the aforementioned embodiment of the disclosure, and transmit the result of determination to the natural language understanding server 500.

The natural language understanding server 500 may perform natural language processing for the received user voice. Specifically, the natural language understanding (NLU) server 500 may change the atypical language data included in the user's voice into formulaic language data that a machine can understand through morpheme analysis, syntax analysis, semantic understanding analysis, etc.

Meanwhile, according to an embodiment of the disclosure, the natural language understanding server 500 may receive information on whether the user voice received from the electronic device 100 corresponds to a subsequent utterance candidate. Accordingly, the natural language understanding server 500 may perform natural language processing for the user voice in consideration of whether the user voice corresponds to a subsequent utterance candidate.

For example, the natural language understanding server 500 that received the text 'How about the weekend?' may receive information that the sentence 'How about the weekend?' is a subsequent utterance candidate of 'How is the weather tomorrow?', and identify that the domain of 'How about the weekend?' is the same domain as the domain of 'How is the weather tomorrow?' based on the information, and the intent of the user is an intent of searching the weather.

The natural language understanding server may transmit the result of processing of the user voice to the electronic device 100, and the electronic device 100 may perform a function corresponding to the result of natural language processing.

Meanwhile, in FIG. 7, the automatic speech recognition server 400 and the natural language understanding server 500 were illustrated as separate devices, but it is obvious that the two servers can be combined and operate as one server.

FIG. 8 is a flow chart for illustrating a control method for an electronic device according to an embodiment of the disclosure.

First, a first user voice and a second user voice may be received in operation S810, and it may be determined whether the second user voice corresponds to a subsequent utterance candidate based on a result of classifying a plurality of attributes of the second user voice according to a predefined attribute in operation S820.

Here, the operation S820 may include the steps of classifying the plurality of attributes according to relevance to the predefined attribute, adjusting attribute values obtained from the plurality of classified attributes, and determining whether the second user voice corresponds to a subsequent utterance candidate of the first user voice based on the plurality of adjusted attribute values.

Here, the step of adjusting attribute values may include the step of, for the plurality of respective attributes, applying different weights to the attribute values of the plurality of classified attributes according to the relevance to the predefined attribute.

Meanwhile, the plurality of attributes may be classified into a first attribute having relevance to the predefined attribute and a second attribute having no relevance to the predefined attribute. Specifically, the predefined attribute may include a time attribute indicating a time interval at which the first user voice and the second user voice were received, the first attribute may include at least one of an utterance frequency or a device state attribute indicating the state of the electronic device 100, and the second attribute may include at least one of a speaker attribute indicating whether a user who uttered the first user voice and a user who uttered the second user voice are the same user or a command attribute indicating similarity between commands included in the first user voice and the second user voice.

Then, it may be determined whether the second user voice corresponds to a subsequent utterance candidate of the first user voice based on the classified attributes in operation S830.

Here, attribute values of the plurality of classified attributes may be adjusted, and it may be determined whether the second user voice corresponds to a subsequent utterance candidate of the first user voice based on the plurality of adjusted attribute values.

In particular, regarding adjusting the attribute values of the plurality of classified attributes, for the plurality of respective attributes, different weights may be applied to the attribute values of the plurality of classified attributes according to the relevance to the predefined attribute.

Specifically, the first attribute value for the first attribute obtained from the second user voice may be adjusted based on the first weight corresponding to the first attribute related to the predefined attribute, and the second attribute value for the second attribute obtained from the second user voice may be adjusted based on the second weight corresponding to the second attribute not related to the predefined attribute.

Here, the first weight may be bigger than the second weight.

Also, the predefined attribute may include a time attribute indicating a time interval at which the first user voice and the second user voice were received.

Meanwhile, the plurality of adjusted attribute values may be summed up, and in case the summed-up attribute value is bigger than a predetermined threshold, it may be determined that the second user voice corresponds to the subsequent utterance candidate, and in case the summed-up attribute value is smaller than or equal to the predetermined threshold, it may be determined that the second user voice does not correspond to the subsequent utterance candidate.

Then, the electronic device may be controlled to perform an operation corresponding to the second user voice based on the intent of the second user voice obtained through a result of the determination in operation S830.

Meanwhile, a user who uttered the first user voice and a user who uttered the second user voice may be respectively determined, and in case the user who uttered the first user voice and the user who uttered the second user voice are the same, the plurality of attribute values for the second user voice may be obtained.

Here, in case the second user voice was received within a predetermined time after the first user voice was received, the plurality of attributes may be classified according to the predefined attribute.

Also, based on whether the second user voice corresponds to the subsequent utterance candidate, the intent for the second user voice may be determined.

Here, in case the second user voice received after the first user voice corresponds to the subsequent utterance candidate, the intent of the second user voice may be determined based on the intent and the domain of the first user voice.

Then, an operation corresponding to the second user voice may be performed based on the determined intent.

Meanwhile, the control method as described above may be implemented as a program including an algorithm that can be executed in a computer, and the program may be provided while being stored in a non-transitory computer readable medium.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

While preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are within the scope of the descriptions of the claims.

What is claimed is:

1. An electronic device comprising:
a voice reception part; and
a processor configured to:
based on a first user voice and a second user voice being received through the voice reception part, determine whether the second user voice corresponds to a subsequent utterance candidate of the first user voice based on a result obtained by classifying a plurality of attributes of the second user voice according to a predefined attribute, and control the electronic device to perform an operation corresponding to the second user voice based on intent of the second user voice obtained through a result of the determination,
wherein the processor is further configured to:
determine whether the second user voice corresponds to a subsequent utterance candidate of the first user voice based on a plurality of adjusted attribute values in which different weights are applied to attribute values of a plurality of classified attributes according to relevance to the predefined attribute.

2. The electronic device of claim 1,
wherein the processor is configured to:
classify the plurality of attributes according to relevance to the predefined attribute; and
adjust attribute values of the plurality of classified attributes by applying different weights to the attribute values of the plurality of classified attributes according to the relevance to the predefined attribute.

3. The electronic device of claim 2,
wherein the plurality of attributes is classified into a first attribute having the relevance to the predefined attribute and a second attribute having no relevance to the predefined attribute, and
the processor is configured to:
adjust a first attribute value for the first attribute obtained from the second user voice based on a first weight corresponding to the first attribute; and
adjust a second attribute value for the second attribute obtained from the second user voice based on a second weight corresponding to the second attribute, and
the first weight is bigger larger than the second weight.

4. The electronic device of claim 3,
wherein the predefined attribute includes a time attribute indicating a time interval at which the first user voice and the second user voice were received,
the first attribute includes at least one of an utterance frequency or a device state attribute indicating a state of the electronic device, and
the second attribute includes at least one of a speaker attribute indicating whether a user who uttered the first user voice and a user who uttered the second user voice are a same user or a command attribute indicating similarity between commands included in the first user voice and the second user voice.

5. The electronic device of claim 1,
wherein the processor is configured to:
determine respectively a user who uttered the first user voice and a user who uttered the second user voice; and
based on the determination that the user who uttered the first user voice and the user who uttered the second user voice being the same, obtain the plurality of attribute values of the second user voice.

6. The electronic device of claim 1,
wherein the processor is configured to:
based on the second user voice being received within a predetermined time after the first user voice was received, classify the plurality of attributes of the second user voice according to the predefined attribute.

7. The electronic device of claim 1,
wherein the processor is configured to:
based on the second user voice being received after the first user voice corresponding to the subsequent utterance candidate, determine the intent of the second user voice based on intent and a domain of the first user voice.

8. An electronic device comprising:
a voice reception part; and
a processor configured to:
based on a first user voice and a second user voice being received through the voice reception part, determine whether the second user voice corresponds to a subsequent utterance candidate of the first user voice based on a result obtained by classifying a plurality of attributes of the second user voice according to a predefined attribute, and control the electronic device to perform an operation corresponding to the second user voice based on intent of the second user voice obtained through a result of the determination,
wherein the processor is configured to:
classify the plurality of attributes according to relevance to the predefined attribute;
adjust attribute values obtained from the plurality of classified attributes;
sum up the plurality of adjusted attribute values; and
based on a summed-up attribute value being larger than a predetermined threshold, determine that the second user voice corresponds to the subsequent utterance candidate, and based on the summed-up attribute value being smaller than or equal to the predetermined threshold, determine that the second user voice does not correspond to the subsequent utterance candidate.

9. A control method for an electronic device, the method comprising:
receiving a first user voice and a second user voice;
determining whether the second user voice corresponds to a subsequent utterance candidate of the first user voice based on a result obtained by classifying a plurality of attributes of the second user voice according to a predefined attribute; and
controlling the electronic device to perform an operation corresponding to the second user voice based on intent of the second user voice obtained through a result of the determination,
wherein the determining comprises:
determining whether the second user voice corresponds to a subsequent utterance candidate of the first user voice based on a plurality of adjusted attribute values in which different weights are applied to attribute values of a plurality of classified attributes according to relevance to the predefined attribute.

10. The control method of claim 9,
wherein the determining comprises:
classifying the plurality of attributes according to relevance to the predefined attribute; and
adjusting attribute values of the plurality of classified attributes by applying different weights to the attribute values of the plurality of classified attributes according to the relevance to the predefined attribute.

11. The control method of claim 9,
wherein the plurality of attributes is classified into a first attribute having the relevance to the predefined attribute and a second attribute having no relevance to the predefined attribute; and
the adjusting a plurality of attribute values comprises:
adjusting a first attribute value for the first attribute obtained from the second user voice based on a first weight corresponding to the first attribute; and
adjusting a second attribute value for the second attribute obtained from the second user voice based on a second weight corresponding to the second attribute, and
the first weight is larger than the second weight.

12. The control method of claim 11,
wherein the predefined attribute includes a time attribute indicating a time interval at which the first user voice and the second user voice were received,
the first attribute includes at least one of an utterance frequency or a device state attribute indicating a state of the electronic device, and
the second attribute includes at least one of a speaker attribute indicating whether a user who uttered the first user voice and a user who uttered the second user voice are a same user or a command attribute indicating similarity between commands included in the first user voice and the second user voice.

13. The control method of claim 9,
wherein the control method comprises:
determining respectively a user who uttered the first user voice and a user who uttered the second user voice; and
based on the determination that the user who uttered the first user voice and the user who uttered the second user voice being same, obtaining the plurality of attribute values of the second user voice.

14. A non-transitory computer-readable recording medium including a program for executing a control method for an electronic device, the method comprising:
receiving a first user voice and a second user voice;
determining whether the second user voice corresponds to a subsequent utterance candidate of the first user voice based on a result obtained by classifying a plurality of attributes of the second user voice according to a predefined attribute; and
controlling the electronic device to perform an operation corresponding to the second user voice based on intent of the second user voice obtained through a result of the determination,
wherein the determining comprises:
determining whether the second user voice corresponds to a subsequent utterance candidate of the first user voice based on a plurality of adjusted attribute values in which different weights are applied to attribute values of a plurality of classified attributes according to relevance to the predefined attribute.

\* \* \* \* \*